Dec. 11, 1934.　　A. F. JACKSON　　1,983,611
STORAGE BATTERY
Filed Sept. 12, 1928　　4 Sheets-Sheet 1

INVENTOR.
Alexander F. Jackson
BY Raymond N. Van Nest
ATTORNEY

Dec. 11, 1934.          A. F. JACKSON          1,983,611
STORAGE BATTERY
Filed Sept. 12, 1928          4 Sheets-Sheet 2

INVENTOR.
Alexander F. Jackson
BY Raymond H. Van Nest
ATTORNEY

Dec. 11, 1934.  A. F. JACKSON  1,983,611
STORAGE BATTERY
Filed Sept. 12, 1928  4 Sheets-Sheet 3

INVENTOR.
Alexander F. Jackson
BY Raymond H. Van Nest
ATTORNEY

Dec. 11, 1934.   A. F. JACKSON   1,983,611
STORAGE BATTERY
Filed Sept. 12, 1928     4 Sheets-Sheet 4
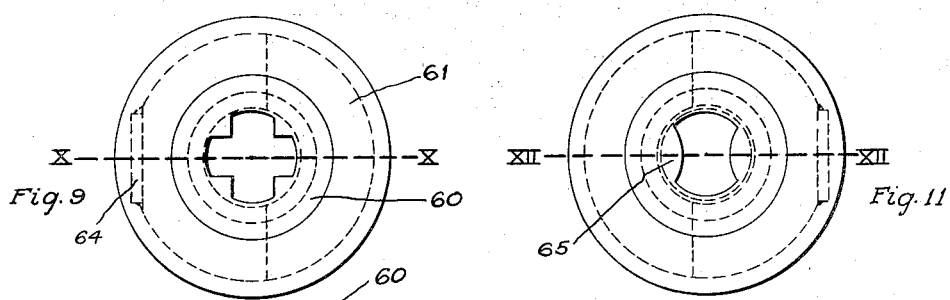
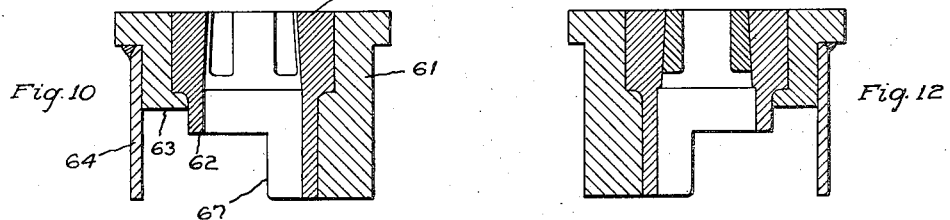
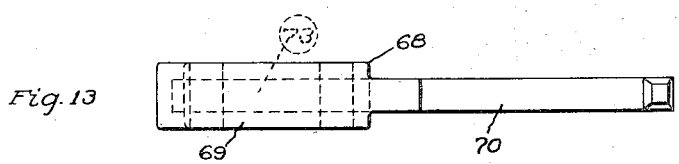
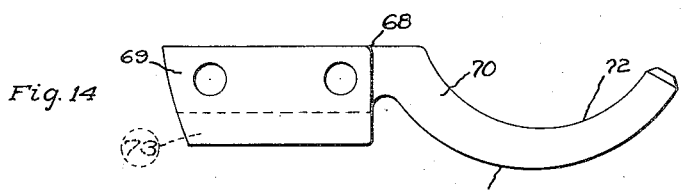
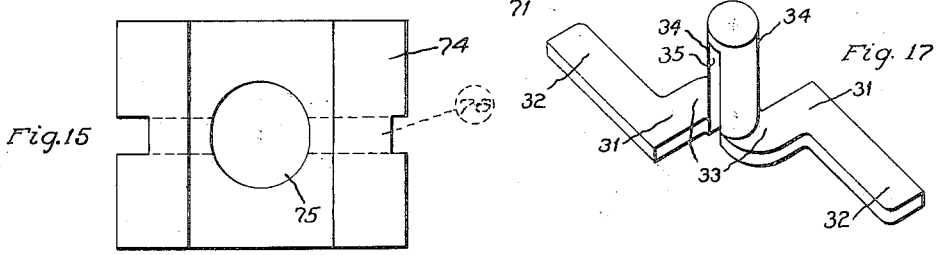
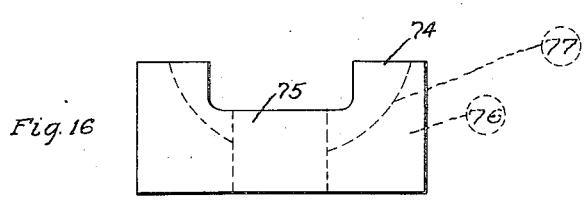
INVENTOR.
Alexander F. Jackson
BY Raymond H. Van Nest
ATTORNEY Patented Dec. 11, 1934

1,983,611

UNITED STATES PATENT OFFICE 1,983,611

STORAGE BATTERY

Alexander F. Jackson, Mount Vernon, N. Y., assignor to U S L Battery Corporation, Niagara Falls, N. Y., a corporation of New York Application September 12, 1928, Serial No. 305,410

2 Claims. (Cl. 136—134)

My present invention relates to storage batteries and more particularly to improvements in the construction of storage batteries of the multicell type, the cells of which are electrically connected together.

In storage batteries commonly used for starting and lighting automobiles, and as a source of power for radio receiving sets, there is ordinarily provided a plurality of cells, usually three in number, in each of which are placed positive and negative plates in alternation, the plates of like polarity in each cell being connected together at their tops by a lead strap. From each said strap there extends upwardly through the cell cover a terminal post. The terminal posts are rigidly secured to the cell covers either by being burned to a lead bushing embedded therein or in some other manner. Plates of like polarity in one cell are connected to plates of opposite polarity in the adjacent cell by means of a lead link which is burned to the cell posts. The positive post of one end cell and the negative post of the opposite end cell serve as terminals whereby the battery may be connected into a circuit. The cell covers are held in position by a plastic sealing compound and are provided with threaded openings closed by vent plugs, through which electrolyte may be introduced into the cell and which permit of inspection of the plates and the escape of the gases formed therein. The plates are supported on spaced bridges which extend laterally across the bottom of the cells.

Several distinct disadvantages exist in batteries of this type. First, the plate groups are not secured in position with sufficient strength to resist entirely the harmful effects of any rough usage to which the battery might be subjected, as in the case of a battery used for automobile starting and lighting purposes. As a result, a large quantity of active material is jarred loose from the plates, reducing the capacity and shortening the life of the battery. Also, the vibrations of the plate groups are transmitted to the cell covers through the terminal post, causing the covers to become loosened from the sealing compound by which they are held in position, and permitting seepage of acid through the cracks thus formed in the compound.

Second, the possibility of acid seepage is greatly enhanced by the perforations which must necessarily be provided in the cell covers for the accommodation of the cell posts. It has been extremely difficult in practice to form a joint between the cell cover and the terminal post sufficiently tight to prevent entirely acid seepage. Even when so formed originally, it frequently becomes loosened, due to the vibrations of the plate groups, and there is a consequent seepage of acid between the post and the cell cover, causing corrosion of the battery terminals.

Third, the connections between the cells are made by means of links, usually of lead, burned to the upper extremities of the cell posts. As the cells are connected in series, the path of the current is thus made unnecessarily long, and the internal resistance of the battery increased by such an arrangement. A large quantity of lead is required for making the connection, which adds appreciably to the cost of manufacturing the battery, lead being the most expensive material used therein.

Fourth, in order to remove a cell cover, it is first necessary to cut away the inter-cell connecting links, thereby increasing the cost and the amount of material and labor required for repairing the battery.

I have provided a storage battery so constructed as to eliminate all of the above enumerated disadvantages and which, in addition, embodies many other advantages and novel features.

An object of this invention is to provide a storage battery in which the plate groups are rigidly and securely held in position whereby vibratory motion of the plates, and movement of the plate groups relative to the cells, is prevented.

A further object of this invention is to provide a storage battery in which the shedding of active material by the plates is reduced to a minimum, thereby prolonging the life of the battery.

A further object of this invention is to provide a storage battery in which the cell covers are held in position by means other than the sealing compound, whereby loosening of the cover from the compound is effectively prevented.

A further object of this invention is to provide a storage battery in which, except for the filling opening, the cell covers are imperforate, all electrical connections being effected independently of said covers, whereby the possibility of seepage of acid and acid fumes and consequent corrosion of the battery terminals is reduced to a minimum, and whereby the covers may be removed without disturbing the electrical connections.

A further object of my invention is to provide a storage battery in which the path of flow of the current between cells has been shortened, thereby reducing the internal resistance of the battery.

A further object of my invention is to provide a battery in the manufacture of which all of the electrical connections are completed before the cell covers are placed on the cell.

A further object of my invention is to provide a storage battery in which the possibility of being externally short-circuited has been reduced to a minimum.

A further object of my invention is to provide a novel method of forming inter-cell connections.

A further object of my invention is to provide a novel method of forming a battery terminal post.

A further object of my invention is to provide a storage battery of lighter weight, more sightly appearance, and which is cheaper to construct than storage batteries heretofore used.

Other objects, features and advantages will be apparent as the description proceeds.

According to the form of my invention illustrated, the cell covers are provided on their lower edges with extensions or feet adapted to rest upon the plate straps. Pressure is exerted upon the covers by screws which engage a portion of the container wall adjacent the ends of the covers. By turning the screws, the covers are forced downwardly and the extended portions at the lower edges thereof caused to press upon the plate straps, holding the plate groups securely in position between the covers and the ridges provided in the bottom of the container and upon which the plates rest. The cell posts are of semi-circular cross-section and are arranged with their flat surfaces flush with the cell partitions in such a manner that posts of opposite polarity in adjacent cells contact with opposite sides of the same section of partition. To establish inter-cell connections it is only necessary to burn the tops of the posts together. The covers are provided with semi-circular recesses for the accommodation of the cell posts. As an additional means for securing rigidity of construction, the end cell posts which are to serve as battery terminal posts, are formed in two parts, one of which is burned to the plates and the other of which is embedded in the container. When the container used is of the unitary moulded type, the latter half of the terminal post may be embedded in the container wall during the molding operation. By burning together the two parts of the terminal posts, a rigid connection is formed between the plate groups and the container.

Instead of extending through the covers as is the case in batteries heretofore in use, the cell posts extend upwardly between the cover and the cell partition, the outer surface of the cover side wall being recessed to fit around the cell posts.

A clearer understanding of my invention may be had by reference to the accompanying drawings in which Fig. 1 is a perspective view of my battery with the covers removed showing the arrangement of the cell posts and manner of effect inter-cell connections.

Fig. 9 is a plan view of the mold used in burning together the two parts of the positive terminal post.

Fig. 10 is a sectional view taken on the line X—X of Fig. 9.

Fig. 11 is a top plan view of the mold used in burning together the two parts of the negative terminal post.

Fig. 12 is a sectional view on line XII—XII of Fig. 11.

Figs. 13 and 14 are top and side views respectively of the tool used in burning together the cell posts.

Figs. 15 and 16 are top and side views of the mold which is placed around the tops of the cell posts while they are being burned together, and Fig. 17 is an isometric view showing two adjacent cell posts and straps, and the manner in which they are joined together.

Figure 1:
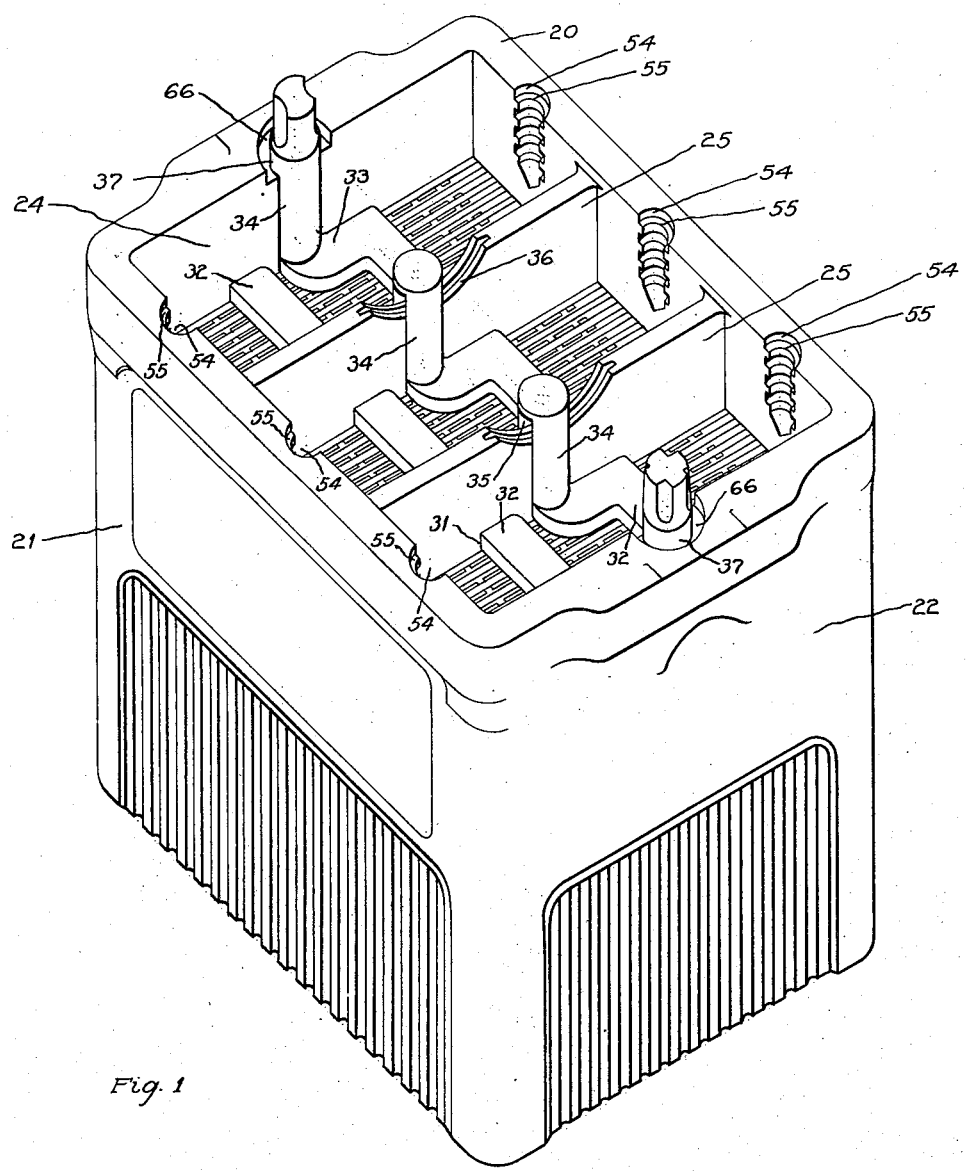

In the construction shown, reference numeral 20 designates a storage battery casing or container having side walls 21, end walls 22 and bottom 23, and which is divided into a plurality of cell chambers 24 by partitions 25. I have shown a battery container having three such chambers, but any desired number may be provided. At the bottom of the container there is provided a plurality of parallel bridges 26 upon which the lower edges of the plates rest and which support the weight of the plates. The container 20 may be of any suitable type, but I prefer to use a unitary molded container in which the partitions 25 and bridges 26 are formed integrally therewith. The container may be molded from any suitable insulating acid-resisting material of which there is a variety well known to those skilled in the art and which may be purchased in the market.

Figure 8:
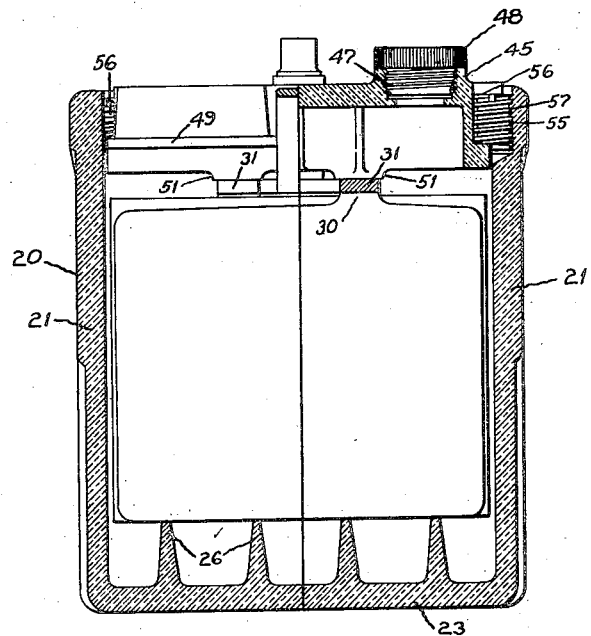
Fig. 8 is a sectional view taken on the line VIII—VIII of Fig. 2.

Each of the chambers 24 contains a plurality of positive plates 27 and negative plates 28 arranged alternately in the customary manner. Each plate is insulated from the adjacent plates by separators 29 of wood or other suitable insulating material having sufficient porosity to permit of rapid diffusion of the battery electrolyte. Extending upwardly from the upper edge of each plate and spaced from the center thereof, is a lug 30. As shown in Fig. 8, the plates of opposite polarity are so arranged that their lugs lie on opposite sides of the longitudinal axis of the container and at equal distances therefrom. Plates of like polarity in each cell are connected by means of said lugs to straps 31. In Fig. 17 I have shown two such straps in detail. Each strap is L-shaped, having a leg 32 to which lugs 30 are burned, and a leg 33 extending at right angles to leg 32. A cell post 34 of semi-circular cross-section rises vertically from the free end of leg 33. The flat surface 35 of post 34 lies in the plane of end surface 36 of leg 33. When the plates are placed within the cell chambers, the flat surfaces 35 and 36 are in contact with the surface of the adjacent partition, or, in the case of the two outer cell posts which form a part of the battery terminal post, with the container end wall. Lugs 30, straps 31 and posts 34 are preferably made of lead. In practice the leg 32 of strap 31 is formed by burning together between retaining walls the tops of the lugs 30. In this manner the leg 32 is formed and lugs 30 burned thereto by the same operation. The leg 33 and cell post 34 are molded in a single piece and are burned to the leg 32, forming the strap 31. By arranging the lugs as shown, so that legs 32 in the same cell when formed, will lie parallel to each other on opposite sides of the center line of the cell, it is necessary to provide but one type of post for both the positive and the negative plate groups. It is obvious from Fig. 1 that any of the posts with attached strap leg 33 therein shown might be reversed as to direction and placed at the opposite side of the cell to form a cell post of opposite polarity. The portions 32 are formed and the legs 33 and posts 34 burned thereto before the plates are assembled into battery elements and placed within the cell. The term battery element is used in this specification to denote an assembly of positive and negative plate groups and separators.

The free edge of each partition 25 is provided at its central portion with an arcuate depression 36. Cell posts 34 are of sufficient length to extend a short distance above said depressed portion. Inter-cell connections are formed by burning together the tops of said posts 34 in a manner to be hereinafter described, it being understood that the battery elements are arranged in the cell chambers so that adjacent posts are of opposite polarity.

An insert 37, preferably of lead, is embedded in each of the container end walls 22 at the free edge thereof. Inserts 37 are of semi-circular cross-section and are provided with ridges 38 and 39 for holding them firmly in position in the container wall. The flat surface of each insert is flush with the inner surface of end wall 22 in which it is embedded and the insert is positioned centrally of said wall so as to contact with the flat surface of the adjacent cell post 34 when the battery element is placed within the cell chamber. The battery terminal posts are formed by burning inserts 37 to said adjacent cell posts in a manner to be hereinafter described.

The construction of the cell covers and the manner in which they are held in position comprise essential features of my invention. Due to the symmetrical arrangement of the parts of my battery, but one form of cover is required. In Figs. 3 to 6 inclusive, I have shown such a cover in detail.

The cover, indicated by the numeral 40, is of substantially rectangular configuration and has depending therefrom side walls 41 and 42, and end walls 43 and 44. Adjacent to end wall 44 is a perforated boss 45 having internal threads 46 to engage corresponding threads 47 on vent plug 48. A bead or ridge 49 is formed on the outer surfaces of walls 41, 42, 43 and 44 and is of sufficient width so that it will contact with the cell walls when the cover is placed over the cell. The walls 41 and 42 are recessed as at 50 to fit around the cell posts. It should be noted that the cell posts extend upwardly from the battery between the cell covers and the cell walls, rather than through the covers as has been the practice heretofore.

On the lower edge of each of the cover side walls 41 and 42 is formed a pair of extensions or feet 51, so located that one foot of each wall will rest on each of the straps 31. Applying a downward force to the covers will cause feet 51 to bear upon straps 31 and hold the plate firmly in position against ridges 26 upon which said plates are supported. The cover may be molded from the same material as the container and may be strengthened by ribs 52 formed integrally on the inner surface thereof.

Figure 2:
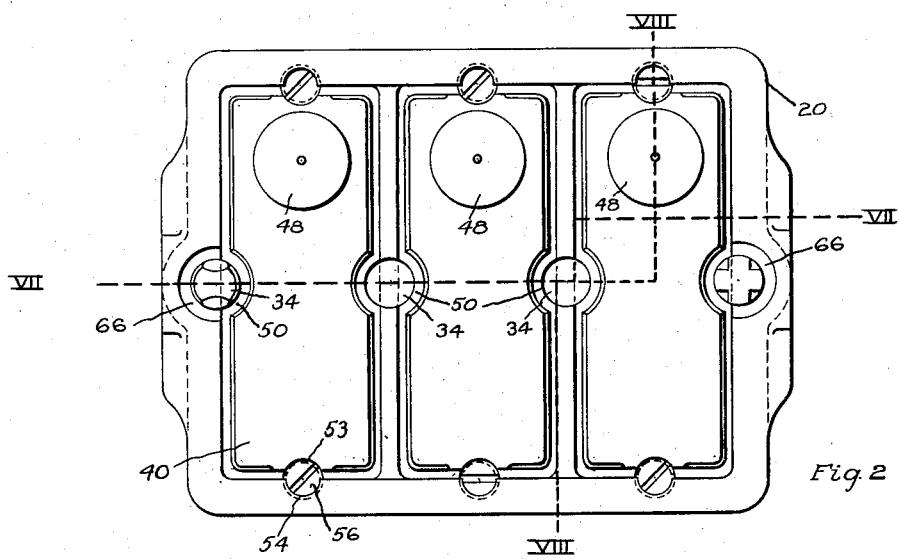
Fig. 2 is a top plan view thereof with the covers in position.
Figure 3:
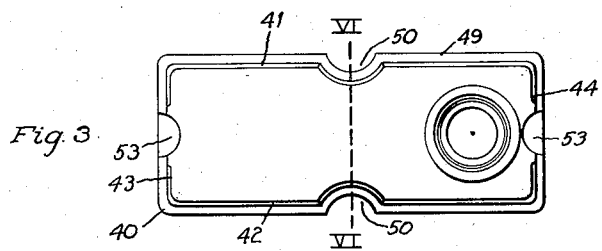
Fig. 3 is a top plan view of the cell cover.
Figure 4:
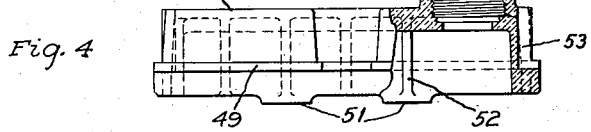
Fig. 4 is a side elevation of the cover partly in section.
Figure 6:
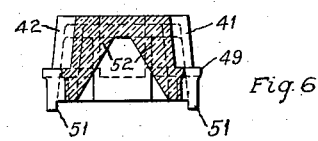
Fig. 6 is a sectional view taken on the line VI—VI of Fig. 3.
Figure 5:
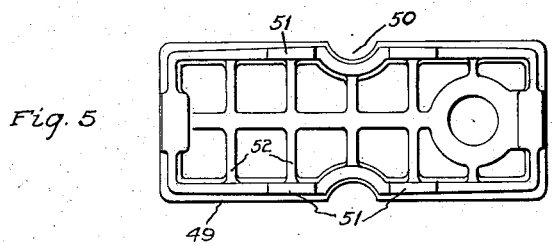
Fig. 5 is a bottom plan view thereof.
Figure 7:
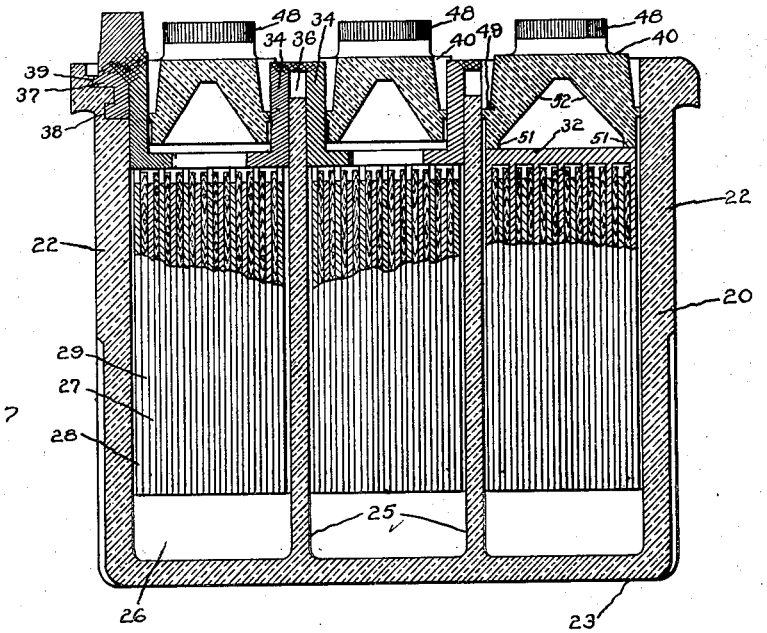
Fig. 7 is a sectional view taken on the line VII—VII of Fig. 2.

In each of the cover end walls 43 and 44 there is provided a semi-circular recess 53 extending vertically from the upper edge of each said wall to the bead or ridge 49, and preferably located midway between walls 41 and 42. A corresponding recess 54 is formed in each cell chamber end wall 24 adjacent its free edge in such a manner that when the cell covers occupy the position shown in Fig. 2 of the drawing, each recess 53 will register with a recess 54 to form substantially cylindrical bores. Recesses 54 are provided with square threads 55. The covers are secured in position by screws 56 having threads 57 corresponding with threads 55 and for engagement therewith. The portions of the bead 49 directly below recesses 53 serve as stops for screws 56. Turning the screws until the lower ends thereof contact with said bead will force the covers downwardly and cause feet 51 to bear upon straps 31 with sufficient pressure to hold the battery elements firmly in position against ridges 26 and will thus eliminate all possibility of movement of the plates relative to the container.

As the molds used in forming the positive and the negative battery terminals are identical, except as to the shape of their inner surfaces, I will describe only one in detail. Figs. 9 and 10 show two views of the positive terminal post mold. This mold is in the form of an inner sleeve 60, surrounding which is an outer sleeve 61. One side of each of the sleeves 60 and 61 is cut away, providing shoulders 62 and 63 on the under side of said sleeves 60 and 61 respectively, the shoulder 62 being at a slightly lower level than the shoulder 63. A flat plate 64 is welded or soldered to the outer surface of sleeve 61. The inner wall of sleeve 60 is tapered slightly at its upper portion and is provided with projections whereby the post, when molded, will have the appearance of a positive sign. The mold is placed around the tops of insert 37 and adjacent cell post 34 in such a manner that shoulder 62 rests on the bottom of an arcuate recess 66 formed concentrically with said insert in the upper edge of wall 22, and the vertical edges 67 of sleeve 60 contact with the inner surface of said wall. Shoulder 63 is at a distance above shoulder 62 equal to the depth of recess 66, so that when the mold is placed in position, the said shoulder 63 will rest upon the upper edge of the wall 22. Plate 64 fits against the outer surface of wall 22 and maintains the mold upright. With the mold in this position, the insert and post are burned together by applying a lead-burning torch thereto. When necessary, sufficient lead may be added during the burning process to build the post up to the desired height.

In burning the tops of the cell posts 34 together, I have provided a tool 68 shown in Figs. 13 and 14, and which comprises a straight portion 69 from which extends a curved arm 70. The lower edge 71 of arm 70 is of the same radius as the edge of depression 36 in partition 25. The upper edge 72 of said arm is of a slightly shorter radius, causing the arm to be somewhat wedge-shaped, the thinner portion being adjacent the free end of said arm. A groove 73 equal in width to the thickness of partitions 25 is formed along the lower edge of the straight portion 69. The tool 68 is positioned with its edge 71 against the surface of depression 36 and is held in position by a portion of the edge of partition 25 which enters groove 73. A mold 74 of the form shown in Figs. 15 and 16 is then placed around the top portions of the posts to be burned together. This mold is made from a solid block of metal and is provided with a bore 75 of sufficient diameter to embrace the tops of the two adjacent cell posts 34. A groove 76 is provided in the under surface of the mold, the inner surface 77 of which is curved along an arc of the same radius as edge 72 of tool arm 70. After the tool 68 has been placed in the position above described, the mold 74 is placed thereon with the surface 77 resting upon said edge 72. The tops of the cell posts 34 extend for a distance within the bore 75. The posts are burned together by applying a lead burning torch through the top of recess 75. After the metal has set, the mold is removed. The tool 68 may be slid from under the joined tops of the posts by tapping the free end to loosen it. Due to its tapered shape it may then be readily removed.

In the assembly of my battery, the positive and negative plates are placed in groups and strap legs 32 are formed thereon by burning together the lugs 30 in each group. The straps 31 are completed by burning a strap leg 33 to each leg 32. The positive and negative plate groups are slid together and separators placed between the plates in the usual manner, forming battery elements, one of which is placed in each cell chamber 24. At this stage, all of the internal electrical connections are made. The two outer cell posts are burned to inserts 37 forming the battery terminal posts and the posts adjacent the cell partitions are burned together in the manner above described to form the inner-cell connections. As the covers have not yet been placed on the cells, a thorough inspection of the battery including the connections is possible. The cell covers are then placed in position and screws 57 are turned in recesses 50 and 54, forcing the covers downwardly upon the battery elements and holding both the covers and the battery elements firmly in place. The battery is now completely assembled with the exception of sealing. It should be noted that before the sealing compound is poured, all of the parts of the battery are rigidly secured in position. The only function of the sealing compound is to prevent acid seepage. The compound is poured around the peripheries of the covers until the space between the cover walls and the cell walls is completely filled. Seepage of acid between cells is prevented by compound which flows into depression 36. The cells are then filled with electrolyte, usually a dilute solution of sulphuric acid, and the battery is ready for use.

The many advantages of my battery are readily apparent from the above description. The plates being prevented from vibratory or slipping movement within the cells, will remain intact for a longer period than those in the ordinary storage battery, and the battery will consequently have a longer life than those heretofore used. There is no possibility of the weight of the plates being carried by the covers, and consequently no stresses acting on the covers tending to loosen them from the sealing compound. Acid seepage is thus reduced to a minimum. By designing the battery so that one type of cell post and one type of cover are required, the cost of manufacturing the battery is materially reduced. The efficiency of the battery is increased and its cost of manufacture further reduced by shortening the inter-cell connections. The covers may be removed for inspecting and repairing by loosening them from the sealing compound and removing screws 56, without disturbing the lead parts of the battery. Because of the symmetrical arrangement of its parts and the elimination of the cell connecting links, the battery is of more sightly appearance than those heretofore used, which is a desirable feature in batteries used as a source of power for radio receiving sets.

I have disclosed in detail one embodiment of my invention for purposes of illustration. Many modifications falling within the purview of this invention will occur to those skilled in the art. It is intended that this patent shall cover all such modifications within the scope of the appended claims.

What I claim as new and desire to secure by Letters Patent of the United States, is

1. A storage battery comprising a container, partitions dividing said container into a plurality of cells, a battery element in and resting on the bottom of each cell, inter-cell connecting means straddling each of said partitions and extending parallel to the lateral surfaces thereof, a terminal post extending vertically from each end cell and at least partially embedded in the wall thereof and held against movement therein, a cell cover for covering each of said cells, said covers having a portion contacting the inner walls of each of said cells respectively and being recessed to fit around said inter-cell connecting means, and means positively engaging a portion of said container and a portion of the periphery of said cell covers and exerting pressure upon said cell covers whereby said covers are positively pressed into engagement with said battery elements whereby said battery elements are rigidly held against movement relative to said container.

2. In a storage battery comprising a container, partitions dividing said container into a plurality of cells, a battery element comprising an assembly of positive and negative plate groups and separators in each of said cells and resting upon the bottoms thereof, connecting straps joining plates of like polarity in each element, inter-cell connecting means straddling each of said partitions and extending parallel to the lateral surfaces thereof, a terminal post extending vertically from each end cell and partially embedded and attached to the wall thereof, a cell cover for each of said cells, said covers having a portion contacting the inner walls of each of said cells respectively and having recesses to fit around said inter-cell connecting means, legs carried by said covers for contacting said straps, and screws positively engaging a portion of said container wall and a portion of the periphery of the cell covers and exerting pressure upon said covers whereby said cell covers are positively pressed into engagement with said battery elements whereby said battery elements are rigidly held against movement relative to said container.

ALEXANDER F. JACKSON.